United States Patent [19]
Van Der Veken

[11] 3,822,013
[45] July 2, 1974

[54] PACKING FOR CAPSULES FOR PREPARATION OF INFUSIONS

[76] Inventor: Germaine Van Der Veken, Vrijheidslaan 171, 1080 Brussels, Belgium

[22] Filed: Sept. 29, 1972

[21] Appl. No.: 293,579

[30] Foreign Application Priority Data
Jan. 18, 1972 Belgium .............................. 778.159

[52] U.S. Cl. .............. 206/223, 206/501, 206/499, 99/295, 206/.5
[51] Int. Cl. ...................... B65d 21/00, B65d 85/62
[58] Field of Search ............ 206/65 K, 0.5, DIG. 18, 206/46 F; 99/77.1, 295, 304, 306

[56] References Cited
UNITED STATES PATENTS

| | | | |
|---|---|---|---|
| 1,021,716 | 3/1912 | Cushman | 206/65 K |
| 1,456,010 | 5/1923 | Richheimer | 99/306 |
| 1,918,109 | 7/1933 | Joyce | 206/DIG. 18 |
| 2,743,664 | 5/1956 | Dale | 99/77.1 |
| 2,761,813 | 9/1956 | Goetz | 206/65 K |
| 3,083,101 | 3/1963 | Noury | 99/295 |
| 3,446,624 | 5/1969 | Luedtke | 99/295 |

Primary Examiner—William T. Dixson, Jr.
Attorney, Agent, or Firm—Bacon & Thomas

[57] ABSTRACT

An infusion package includes a filter body having stacked therein multiple infusion capsules intended for use with the filter body, the bottom capsule occupying the normal capsule position in the filter body, the remaining capsules being nested thereabove where they are held in place by a top closure for the filter body. An imperforate cover over the bottom capsule closes the bottom opening of the filter body. Multiple filter bodies may be nested together according to this invention, and various lid details and hermetic sealing means are described.

8 Claims, 4 Drawing Figures

PATENTED JUL 2 1974 3,822,013

PACKING FOR CAPSULES FOR PREPARATION OF INFUSIONS

This invention relates to a package for capsules intended for the preparation of infusions, more particularly capsules for single use and preferably capsules which can be put on the market optionally filled, with the objective that the capsules may be either filled previously with a determined quantity and quality of coffee, tea or similar or that such capsules may be empty on the market to be filled upon use with the required quantity and quality of coffee, tea or similar products.

These capsules are already known and are generally put on the market in a package consisting of a cellophane wrapping, of a paper bag, a metal box or the like.

It is known that such capsules, for example, are generally used in a filtering body, while according to a special design of such capsules which is more particularly contemplated by this invention, the capsules are constructed in such a way that they are able to cooperate with an adequate opening in the bottom of the filtering body which bears and supports the capsule during the percolating process, whereby both the capsule and the filtering body are made of a very inexpensive material, so that on the one hand the capsule can be thrown away after a single use and on the other hand the filtering body can also be thrown away either after a single use or after a certain number of uses with different capsules.

This invention covers a package which makes available to the consumer a set of capsules in a packing consisting of a filtering body proper which can cooperate with such capsules for the purpose of preparing an infusion, while the dimensions and shape of the capsules are preferably designed so that a certain number of the same can be stored in the filtering body, whereas the lid normally used with this filtering body acts at the same time as a lid for the package, so that it not only closes the filtering body and the package but also works as a restraining element on the capsules in order to maintain the latter in their place with respect to and in the filtering body.

The advantage obtained by this device is that no special package is required to put a small set of capsules on the market and, at the same time, no special room is taken up by the filtering bodies which are supplied along with the capsules in order to enable their use.

By filling such capsules previously with coffee, tea or the like, it is possible, with a view to retaining the flavour to the largest possible extent, to provide this packing with an adequate air-tight hermetic seal and possibly to set it under sub-pressure (vacuum). This can be done in a simple way, by adequately making the seams and openings air-tight, and for instance, by applying an adhesive strip and/or an adhesive to the various openings or joint areas.

WITH REFERENCE TO THE DRAWINGS:

Figure 1:
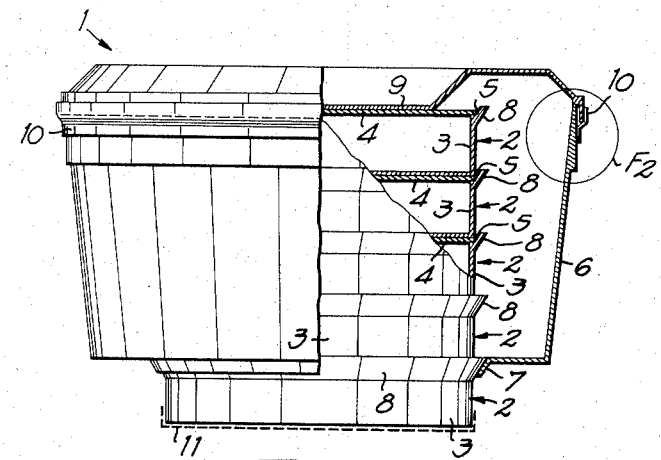
FIG. 1 is an elevational, partial cutaway view of an infusion package according to the invention.
Figure 2:
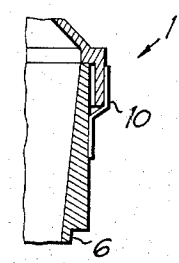
FIG. 2 shows on a larger scale the part which is indicated in FIG. 1 by F2.

FIGS. 1 and 2 show an infusion package 1 according to the invention for capsules 2 which, according to the customers need, are optionally filled in advance with coffee or the like. In effect, such capsules 2, consisting of a bowl 3 and a lid 4, between which means are preferably provided so as to allow a certain fixing or restraint of motion between elements 3 and 4. Capsules 2 are normally filled in advance with the quantity of coffee or the like which is adequate for preparing one, two or more cups of infusion, or otherwise empty wrappings can be supplied, in which case it is the user who, before preparing an infusion, fills the wrapping with the adequate quantity and required quality of coffee, tea or the like.

The packing proper consists of five piled up preferably slightly nested capsules 2 in this case, which preferably fit somewhat in each other due to the presence of a rim 5 which is shown on these capsules. This set of capsules is placed in a filtering body 6 which is provided in the bottom with a conical opening 7 which cooperates with the conical part 8 of a capsule when an infusion must be prepared. However it must be understood that, according to the invention, the packing is not restricted to a filtering body with conical opening 7 and capsules with conical rim 8, but that it extends to any filtering bodies which are liable to cooperate with capsules which are adequate for the purpose.

The dimensions of every capsule 2 will preferably be such that, when the lowermost capsule is placed in the filtering body 6 in the manner in which it is normally placed in this body 6 when an infusion is being prepared, the lid 4 of the upper capsule leans exactly against the lid 9 which is normally placed on the filtering body 6 during the preparation of the infusion, so that in this manner the set of capsules 2 is pressed into the body 6. Of course, the lid 9 could engage any portion of capsule 2 to restrain its motion towards the top opening in the filter body 6.

Moreover, for the purpose of fixing the lid 9 with the filtering body 6, a connection must preferably be created between both elements; in this embodiment the latter will consist of an adhesive strip 10 covering the whole circumference.

This enables obtaining a package for capsules 2 which is formed by a filtering body wherewith such capsules cooperate normally during the percolating process, so that not only is an effectual package obtained for the capsules, but also a inexpensive package is produced, since no additional packing elements, such as boxes, paper or plastic wrapping or the like are required. Another advantage afforded by this design is that no special separate space is occupied for capsules on the one hand and filter bodies on the other.

If the aforesaid are supplied empty, such packing will quite meet the purpose, but if the purpose is to supply such capsules 2 in a packing 6-9 and to fill them previously with coffee or the like, it will usually be necessary, in order to keep the flavour of the coffee or the like contained in the wrappings, to apply the adhesive strip 10 so that it constitutes an air-tight closing. Also, the lower capsule 3 can be provided with a closing piece 11 in the shape of a bowl or cover, which fits resiliently over the lower end of the lower capsule 2 so as to obtain an air-tight closing also at this spot. This element 11 can be constructed of any material, for instance plastic material.

The piece 11 can also, of course, be replaced by an adhesive disc or the like.

Figure 3:
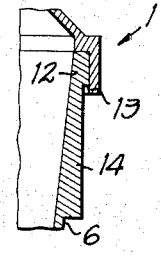
FIG. 3 is a view similar to that of FIG. 2, but for an alternate embodiment.

FIG. 3 shows a design in which, if the package, formed by the filtering body 6 and the lid 9 is filled with capsules 2, the connection between the lid 9 and the filtering body 6 is obtained by providing the filtering body 6 at the upper space with an additional rim portion 12 which is directed radially outwards and by providing the peripheral rim of the lid 9 with a resilient hooking element 13, in such a manner that the various capsules are pushed on each other by the lid 9 so that the hooks 13, which optionally run over the whole inside circumference of the lid, are hooked under the rim 12.

In addition, it is obvious that in this design alternative, when capsules 2 are filled with coffee, tea or the like, the strip 10 on the one hand and an element 11 on the other hand can be applied in order to safeguard the flavour.

Figure 4:
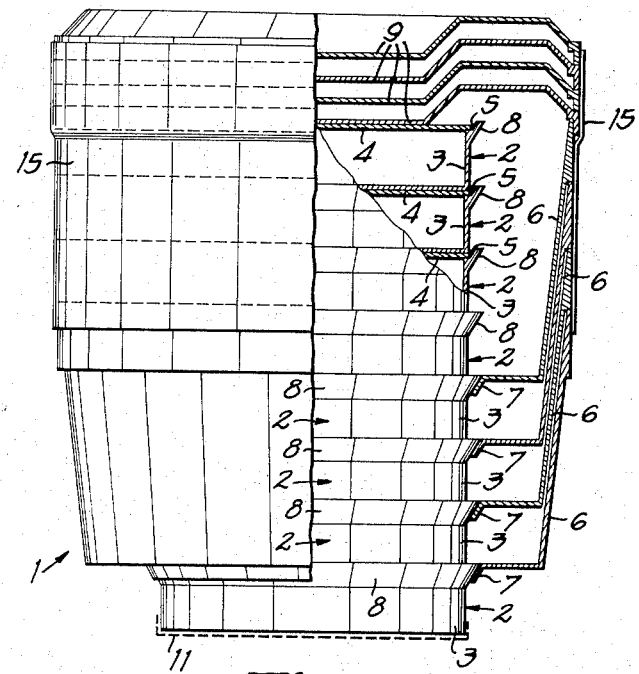
FIG. 4 shows a partial cutaway elevational view of an alternative infusion package according to this invention.

FIG. 4 shows an alternative design of an infusion package which is formed approximately along the same lines as FIG. 1, but in this case the packing of five capsules 2 is accomplished with three additional filtering bodies 6 and the same number of filtering lids 9, each of which has an additional capsule 3, so that in this case a packing consists of four filtering bodies 6 and four lids 8 containing eight capsules 2, 3. In certain cases this can be more attractive, considering that right from the first purchase the buyer obtains several filtering bodies 6 and lids 9 along with a the number of capsules 2.

It should be noted that the filtering bodies may be provided with a rim 14, with the result that, when the capsules 2 are piled up, as shown in FIG. 4, they interlock and rest accurately on each other and are prevented from collapsing inwardly by the nested and interlocked filter bodies.

In this case too, the packing can eventually be made tight adequately by applying, for instance, a wide adhesive strip or the like 15 which can be used for advertising or other purposes and an element 11 as indicated above.

This invention is by no means restricted to the designs described as examples and reproduced in the attached drawings. However such packages can be realized in any shape and dimensions, depending on the size of the capsules on the one hand and on the number of cup infusions which are required on the other hand, starting from one capsule 2.

What I claim is:

1. An infusion package comprising:
   a. a filter body having top and bottom openings;
   b. multiple, stacked infusion capsules supported by and within said filter body, each of said capsules being useable with said filter body during an infusion process; and
   c. closure means for said filter body openings.

2. The infusion package recited in claim 1 further wherein:
   a. the closure means for said top opening of said filter body comprises a lid, said lid having means for restraining the topmost capsule against movement in a direction toward said top opening; and
   b. the lowermost infusion capsule is supported in a position within said filter body corresponding to the position normally occupied by an infusion capsule during a normal infusion process.

3. The infusion package recited in claim 2, further wherein:
   a. said lowermost capsule extends across said lower opening in said filter body;
   b. said lower capsule includes a bottom imperforate cover; and
   c. said lowermost capsule and imperforate cover comprising said closure means for said filter body bottom opening.

4. The infusion package recited in claim 2, further wherein:
   a. said filter body includes a radially projecting rim portion adjacent said top opening;
   b. said lid includes peripheral, resilient means for engaging said projecting rim portion for normally preventing movement of the lid from its closure position, and also includes a central area engaging the said topmost capsule;
   c. said filter body rim projection, lid resilient engaging means, and lid central area all comprising said recited means for restraining said topmost capsule against movement toward said filter body top opening.

5. An infusion package comprising:
   a. at least a pair of nested filter bodies, each filter body having top and bottom openings;
   b. first infusion capsules extending across each of said bottom openings of said filter bodies, and supported thereat by each of said filter bodies;
   c. a plurality of infusion capsules stacked on the uppermost of said first infusion capsules;
   d. a first closure for the top opening of the uppermost of said nested filter bodies; and
   e. a second closure for the bottom opening of the lowermost of said nested filter bodies.

6. The infusion package recited in claim 5, further wherein the nested filter bodies each include peripheral rim projections which interengage when the filter bodies are nested to prevent inward collapse of the nested arrangement.

7. The infusion package recited in claim 6, further including a bottom imperforate cover for the lowermost of said first capsules, the combination of said lowermost first infusion capsule and said imperforate cover comprising said closure for the bottom opening of the lowermost of said nested filter bodies.

8. The infusion package recited in claim 7, further wherein:
   a. said top closure comprises multiple, nested lids for the top openings of said nested filter bodies, the lowermost lid only engaging the uppermost of said nested filter bodies;
   b. said uppermost of said nested filter bodies includes means for restraining motion of said plurality of infusion capsules towards the said top opening of said uppermost nested filter body;
   c. said first capsules and said plurality of stacked capsules all being in nested contact with each other within said package; and
   d. further including means for removably securing said nested filter bodies and lids together as a package assembly.

* * * * *